United States Patent [19]

Yamada et al.

[11] Patent Number: 4,992,111
[45] Date of Patent: Feb. 12, 1991

[54] BEARING RACE MEMBER AND METHOD OF FABRICATION

[75] Inventors: Hiroshi Yamada, Mie; Hirokazu Nakajima, Gifu; Noriyuki Tsushima, Mie; Hirotsugu Hamaoka, Hyogo, all of Japan

[73] Assignee: N.T.N. Corporation, Osaka, Japan

[21] Appl. No.: 391,147

[22] Filed: Aug. 8, 1989

[51] Int. Cl.$^5$ .............. C22C 38/02; C22C 38/06; C21D 9/36

[52] U.S. Cl. .................. 148/12.4; 148/320; 148/333; 148/906; 148/143; 384/492; 384/912

[58] Field of Search .......... 148/320, 333, 906, 12.4, 148/143; 420/8; 384/492, 540, 569, 912, 625

[56] References Cited

U.S. PATENT DOCUMENTS 3,859,146  1/1975  Habrovec et al. ............... 148/906
4,871,268 10/1989  Furumura et al. .............. 148/906

FOREIGN PATENT DOCUMENTS 60-50149  3/1985  Japan ........................ 148/320

Primary Examiner—Deborah Yee
Attorney, Agent, or Firm—Morrison Law Firm

[57] ABSTRACT

A bearing race member composed of steel containing 0.60 to 0.85% carbon by weight, 0.5 to 1.0% by weight in a single content or total contents of Si and Al, and 13 ppm or less oxygen, wherein said bearing race member is quenched and subsequently tempered to contain 15% or less retained austenite therein. Even though basically made of structural carbon steel, the bearing race member has a long life equal to that of high-carbon chromium bearing steel and is superior in dimensional stability and crack fatigue strength.

7 Claims, 5 Drawing Sheets

BEARING RACE MEMBER AND METHOD OF FABRICATION

BACKGROUND OF THE INVENTION

1. Field of the Invention

The present invention relates to a bearing race member basically made of structural carbon steel.

2. Prior Art

Unlike other precision machine parts, a ball-and-roller bearing race member or a linear bearing race member (hereinafter referred to as bearing race member) is subjected to extremely high contact stress. Therefore, bearing race members must have superior bearing fatigue strength (so-called bearing life and hereafter simply referred to as "life"). High-carbon chromium bearing steel containing 0.95 to 1.10% C, 1.30 to 1.60% Cr, 0.15 to 0.35% Si, 0.50% or less Mn, 0.025% or less P and 0.025% or less S by weight (equivalent to SUJ2 of JIS) has been mainly used to satisfy the high bearing fatigue strength. Because the above-mentioned high-carbon chromium bearing steel includes abundant alloy elements, segregation of the alloy elements occurs in the solidifying process during steel manufacturing. Eliminating this segregation requires a soaking treatment wherein the steel is heated at a high temperature for a long time (for example at 1,200° C. for 12 hours). In addition, the cost of the steel is high because it includes chromium. For unsevere bearing applications, structural carbon steel (less expensive than the high-carbon chromium bearing steel) containing 0.45 to 0.65% C (equivalent to S45C or S55C of JIS) is sometimes used after the bearing race surface is hardened by induction. However, structural carbon steel is inferior to high-carbon chromium bearing steel in that the life of the former is less than half of that of the latter.

SUMMARY OF THE INVENTION

After various studies and experiments regarding bearing race members basically made of steel which are less expensive than the high-carbon chromium bearing steel and whose lives equal as that of the high-carbon chromium bearing steel, the inventors of the present invention intend to provide a bearing race member which is basically made of structural carbon steel and is capable of satisfying the above-mentioned requirements. The present invention thus relates to a bearing race member composed of steel containing 0.60 to 0.85% carbon by weight, 0.5 to 1.0% by weight in a single content or total contents of Si and Al, and 13 ppm or less oxygen, wherein said bearing race member is quenched and subsequently tempered to contain 15% or less retained austenite therein, and the hardness of the race member is in the range of $H_{RC}$ 60 to 63. The special structures and objects provided for the structural carbon steel of the present invention are summarized as follows:

(i) The carbon content of the structural carbon steel is set between those of medium carbon steel and high carbon steel.

(ii) Either or both of Si and Al, amounting to between 0.5 and 1.0% in a single content or total contents, is added to increase the resistance to temper softening so that the steel can be tempered at a temperature higher than the normal tempering temperature. As a result, the hardness of the steel is raised to $H_{RC}$ 60 or more, preferably within the range of $H_{RC}$ 60 to 63. The life of the structural carbon steel is extended to equal that of high-carbon chromium bearing steel.

(iii) The dimensional stability of the structural carbon steel as well as its life are improved by the above-mentioned high-temperature tempering.

(iv) The retained austenite is reduced to 15% or less to ensure a long life and superior dimensional stability.

(v) The oxygen content is reduced to 13 ppm or less to improve crack fatigue strength.

(vi) The Si content is limited up to 1.0% to maintain the resistance to rust within a practical application range.

BRIEF DESCRIPTION OF THE DRAWINGS

The present invention is detailed referring to the attached various characteristic graphs.

DETAILED DESCRIPTION OF THE INVENTION

The elements of the bearing race member of the present invention are detailed as follows:

(i) C

To obtain sufficient hardness by quenching and tempering, 0.60% or more carbon is required (although this is not shown). If a large amount of carbon is included, however, a soaking treatment (a heat treatment conducted for example at 1,200° C. for 12 hours to relieve segregation of carbon and alloy elements generated during solidification) is necessary. By experiments, we found that the soaking treatment was not necessary when the carbon content is 0.85% or less. Accordingly, the carbon content should be 0.60 to 0.85%.

(ii) Si, Al

Figure 1A:
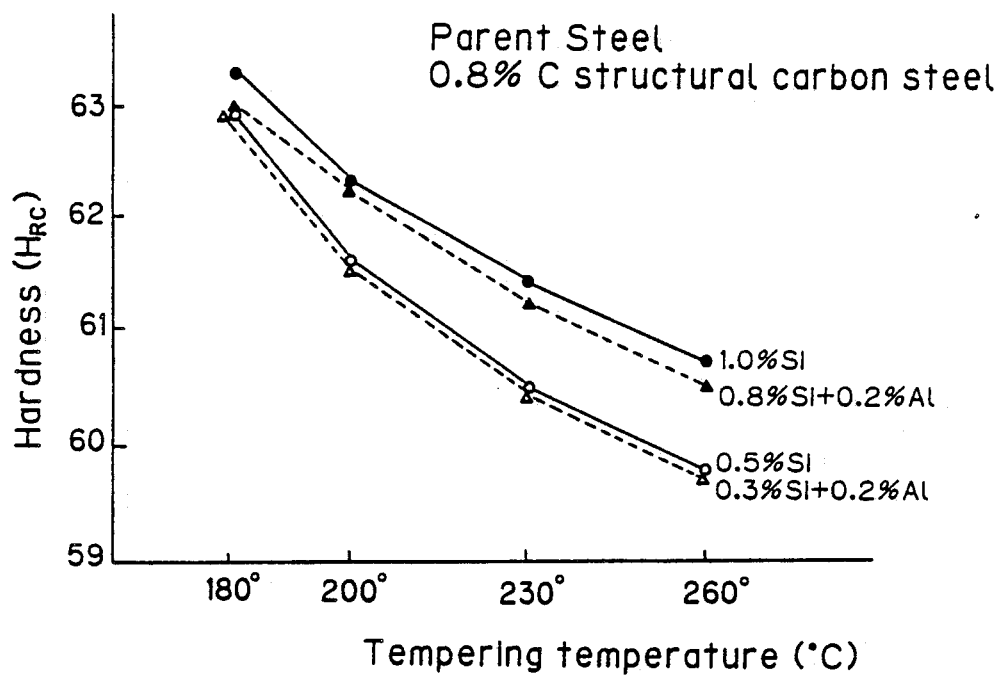
FIG. 1 (a) is a characteristic graph illustrating the relationship between tempering temperature and hardness of the structural carbon steel containing 0.8% C with Si and Al added, FIG. 1 (b) is a characteristic graph illustrating the relationship between tempering temperature and hardness of the structural carbon steel containing 0.65% C with Si and Al added.
Figure 1B:
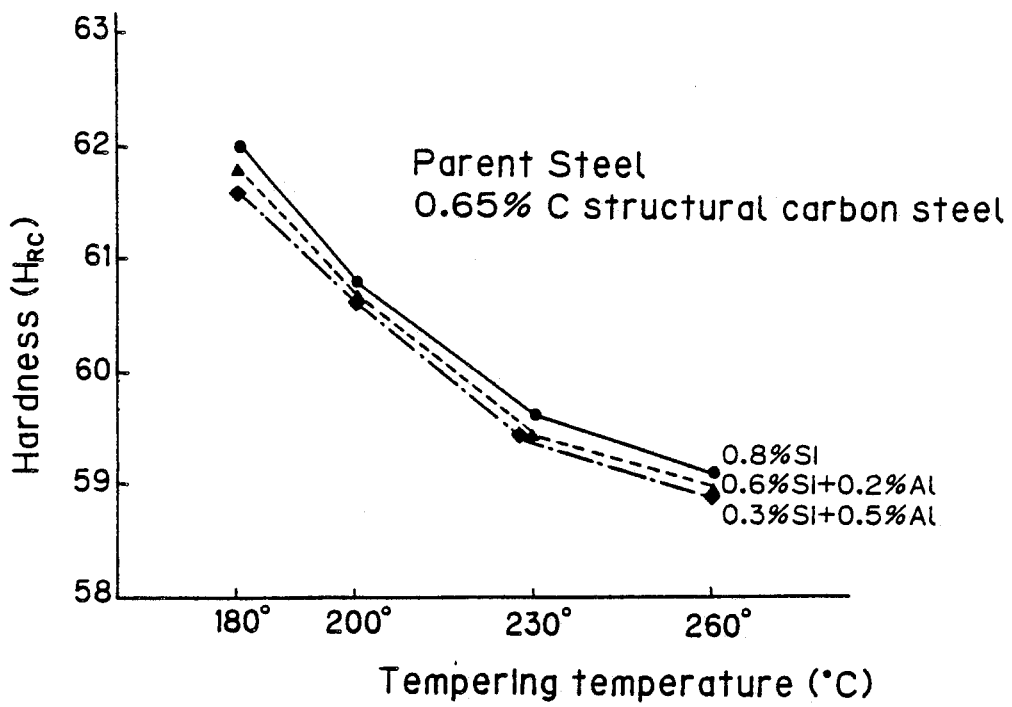

FIGS. 1 (a) and (b) shows the effect of only Si or Al or both Si and Al to the resistance to temper softening at 180° to 260° C. which is above the normal tempering temperature of 170° C. The resistance of steel containing only Si is almost equal to but slightly higher than that of the steel containing Al.

Figure 2:
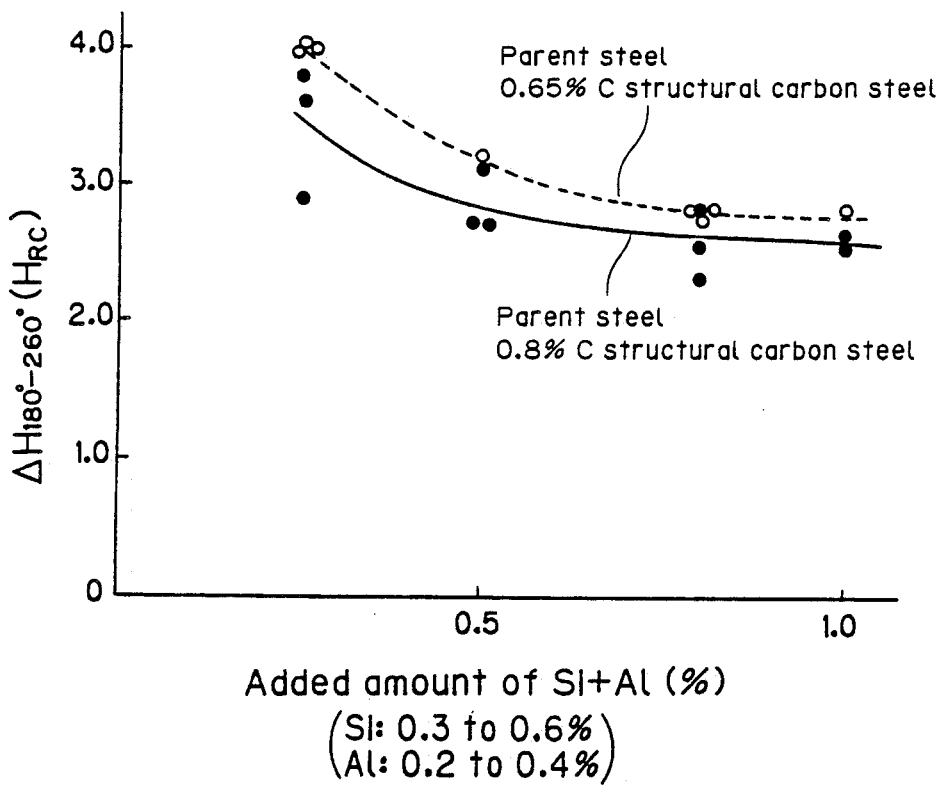
FIG. 2 is a characteristic graph illustrating the relationship between the total of both the Si and Al contents added to structural carbon steel and hardness reduction ($\Delta H$ = hardness after tempering at 180° C. —hardness after tempering at 260° C.)
Figure 3:
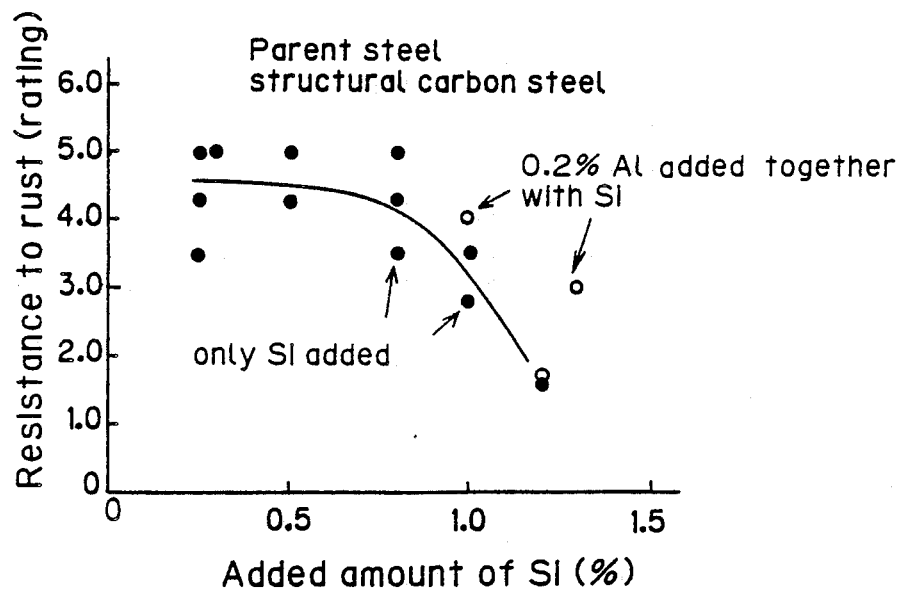
FIG. 3 is a characteristic graph illustrating the relationship between the resistance to rust the structural carbon steel containing Si or both Si and Al.
Figure 4:
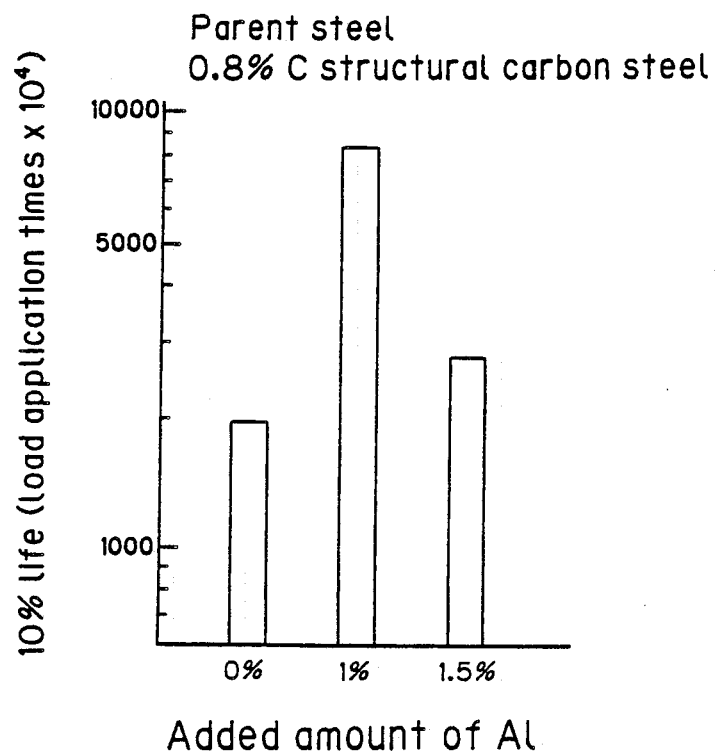
FIG. 4 is a characteristic graph illustrating the relationship between the Al content in structural carbon steel containing 0.8% C and the life of the steel.

Referring to FIG. 2, the resistance to temper softening is larger as the total of both Si and Al contents increases. The effect is significant when the total of the contents is 0.5% or larger. However, as the total of Si and Al contents increases, the machinability of the steel lowers and a soaking treatment is necessary, although this is not shown. Therefore, the upper limit of the total of the contents should be 1%. FIG. 3 shows the effect of only Si to resistance to rust. The resistance to rust abruptly decreases as Si exceeds 1%. Therefore, the upper limit of Si should be 1%. When only Al is contained, Al does not adversely affect the resistance to rust although this is not shown. However, as Al increases, the cleanliness of the steel deteriorates. As shown in FIG. 4, the life of the steel containing 1.5% Al is significantly lower than that of the steel containing 1.0% Al. Therefore, the upper limit of Al should be 1.0%. Accordingly, only Si content, only Al content or the total of both Si and Al contents should be 0.5 to 1.0%.

(iii) Mn, Cr

In addition to the above-mentioned alloy elements having the above-mentioned positive effects, the addition of proper amounts of Mn and Cr to structural carbon steel of the type requiring a longer life has been conducted to improve quenching performance. The steel of the present invention can also include Mn and Cr depending on the thickness of bearing members provided that their contents are within the conventional ranges. However, Cr should not exceed 1.0% to eliminate the need for any soaking treatment, and Mn should be less 0.5% due to economical reason.

(iv) Oxygen

Figure 5:
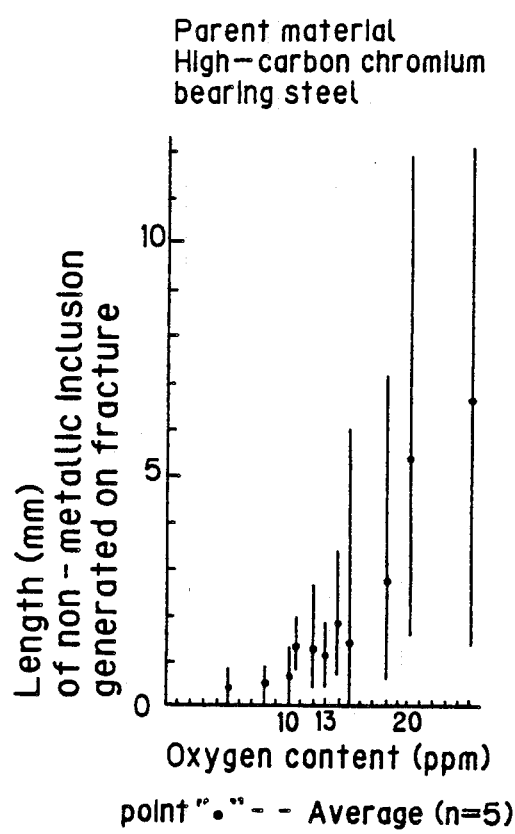
FIG. 5 is a characteristic graph illustrating the relationship between the oxygen content in conventional high-carbon chromium steel and the lengths of the non-metallic inclusions generated at fracture surfaces.
Figure 6:
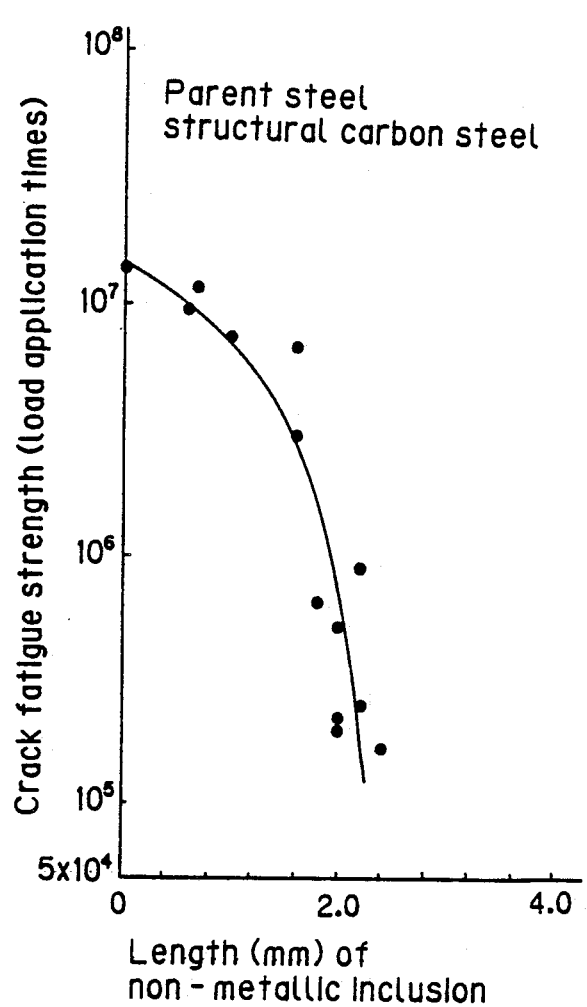
FIG. 6 is a characteristic graph illustrating the relationship between the lengths of the non-metallic inclusions and the crack fatigue strength of structural carbon steel.

In the case of high-carbon chromium bearing steel (SUJ2 of JIS), it is known that the amount of non-metallic inclusions is stably small when the oxygen content is 13 ppm or less, as shown in FIG. 5. In the case of structural carbon steel, its crack fatigue strength significantly increases when the lengths of the inclusions are 2.0 mm or less, as shown in FIG. 6. Judging from the current advanced steel manufacturing technology, the relationship between the oxygen content and non-metallic inclusions of structural carbon steel is regarded as almost the same as that shown in FIG. 5. Accordingly, the oxygen content of the steel of the present invention should be 13 ppm.

(v) Hardness

Figure 7:
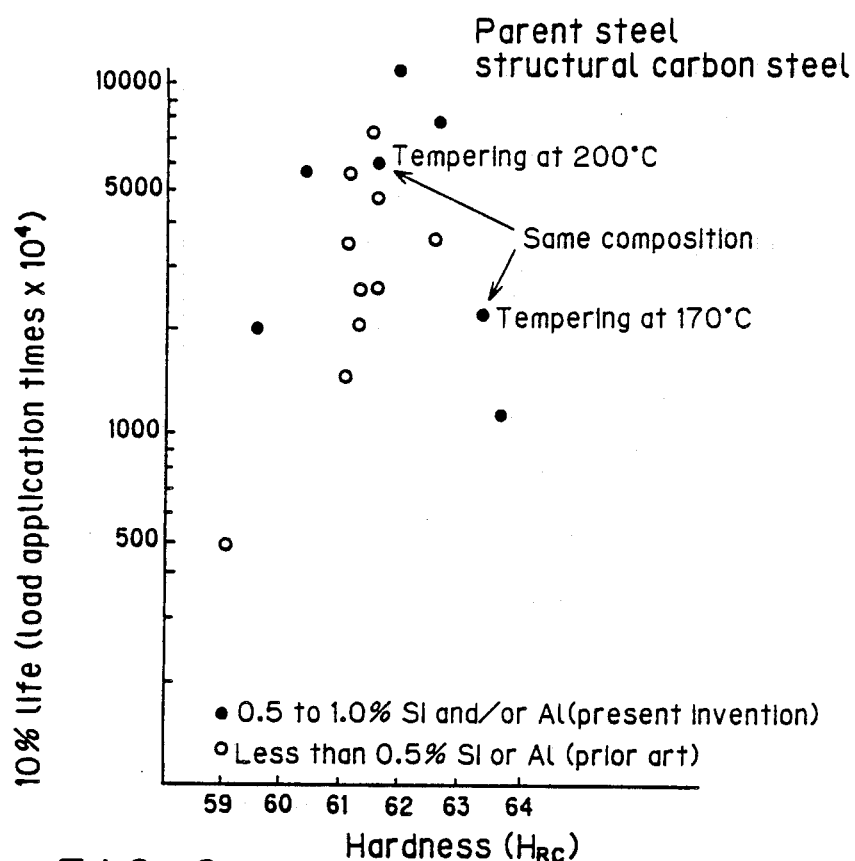
FIG. 7 is a characteristic graph illustrating the relationship between the hardness and life of the structural carbon steel of the present invention in comparison with the structural carbon steel of the prior art.

According to FIG. 7, the life of structural carbon steel is shortened if the hardness drops below $H_{RC}$ 60. On the contrary if the hardness exceeds $H_{RC}$ 63, the life is also shortened. Accordingly, it can be said simply that the hardness range should be between $H_{RC}$ 60 to 63 to obtain a long life. However, even if the hardness exceeds $H_{RC}$ 63 when tempering is performed at the normal tempering temperature of 170° C., the hardness can be reduced to the range of $H_{RC}$ 60 to 63 by raising the tempering temperature.

(vi) Retained Austenite

Raising the tempering temperature to the extent that the hardness is not reduced too much is desirable to obtain a long life and dimensional stability. In the case of the steel of the present invention, it is obvious according to the above-mentioned explanations that the resistance to temper softening is improved by Si and Al contained in the steel and tempering is thus possible at a higher temperature. Table 1 shows the relationship between the amount of retained austenite and hardness in the case of structural carbon steel. According to the table, the upper limit amount of retained austenite should be 15% to maintain the hardness of $H_{RC}$ 63.

TABLE 1

| Tempering temperature | Retained austenite (%) and hardness Sample | |
|---|---|---|
| | 0.65% C, 0.8% Si | 0.80% C, 0.8% Si |
| 170° C. | 11% to 13% ($H_{RC}$ 61 to 62) | 13% to 15% ($H_{RC}$ 62 to 63) |
| 200° C. | 7% to 9% ($H_{RC}$ 60 to 61) | 9% to 11% ($H_{RC}$ 61.5 to 62) |

Figure 8:
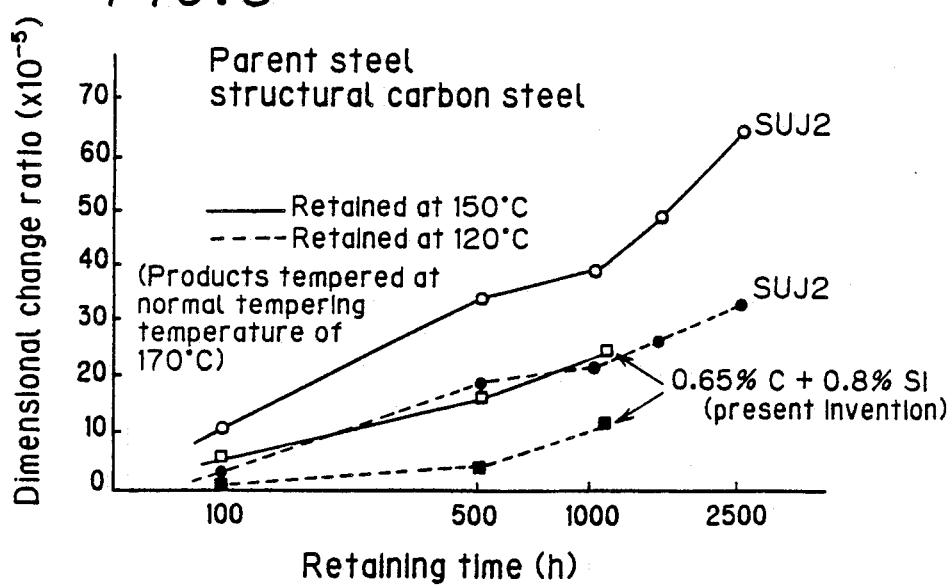
FIG. 8 is a characteristic graph illustrating the relationship between the retaining time and dimensional change ratio of the structural carbon steel of the samples listed in Table 1 of this specification.

FIG. 8 illustrates the relationship between the retaining time and dimensional change ratio of bearing members tempered at the normal tempering temperature of 170° C. The dimensional change ratio of the structural carbon steel of the present invention is lower than that of the known high-carbon chromium bearing steel (SUJ2 of JIS) at both the retaining temperatures of 150° C. and 120° C. When this is considered together with Table 1, the retained austenite should be 15% or less to obtain bearing members with a long life and high dimensional stability provided that bearing members are tempered at the normal tempering temperature of 170° C. As described above, the present invention can provide a bearing race member which has a long life equal to that of high-carbon chromium bearing steel and is superior in dimensional stability, crack fatigue strength and resistance to rust by improving the resistance to temper softening even though the bearing race member is basically made of structural carbon steel which is less expensive than high-carbon chromium bearing steel. Accordingly, extensive application of structural carbon steel to bearing race members is realized by the invention, offering numerous advantages.

We claim:

1. A bearing race member being made with an alloy steel consisting essentially of 0.60 to 0.85% carbon by weight, 0.5 to 1.0% by total weight of one or a combination of Si and Al, 13 ppm or less oxygen and the balance of Fe, said steel being a structural carbon steel, said structural carbon steel having been subjected to quenching and tempering to obtain 15% or less retained austenite by volume therein and a hardness of said bearing race of HRC 60 or more.

2. A bearing race member according to claim 1, wherein 1.0% or less chromium by weight is contained therein.

3. A bearing race member according to claim 1, wherein 0.60 to 0.85% C by weight, 0.8% Si by weight and 7 to 15% retained austenite by volume are contained therein and the hardness of said bearing race member is between HRC 60 and 63.

4. A bearing race member according to claim 3, wherein 0.80% C by weight, 0.8% Si by weight and 13 to 15% retained austenite by volume are contained therein and the hardness of said bearing race member is between HRC 62 and 63.

5. A bearing race member according to claim 1, wherein said bearing race member is a ball-and-roller bearing race or a linear bearing race member.

6. A method for producing a bearing race member comprising:

forming a bearing race member from a structural steel having 0.6 to 0.85 percent carbon by weight, 0.5 to 1.0 percent total weight of one or a combination of Si and Al, 13 ppm or less oxygen and the balance of Fe;

quenching said bearing race member;

tempering said bearing race member; and performing said quenching and tempering steps for a time and at a temperature effective to provide 15 percent or less retained austenite by volume and a hardness of said bearing race of HRC 60 or more.

7. A method according to claim 6 further comprising performing said steps of quenching and tempering for a time and at a temperature effective to obtain a bearing race hardness of between about HRC 60 and about HRC 63.

* * * * *

UNITED STATES PATENT AND TRADEMARK OFFICE
CERTIFICATE OF CORRECTION

PATENT NO.  : 4,992,111

DATED       : February 12, 1991

INVENTOR(S) : Hiroshi Yamada, Hirokazu Nakajima, Noriyuki Tsushima
              Hiroji Hamaoka It is certified that error appears in the above-identified patent and that said Letters Patent is hereby corrected as shown below:

On the title page, the fourth inventor should read as follows:

-- Hiroji Hamaoka --.

Signed and Sealed this

Eleventh Day of August, 1992

*Attest:*

DOUGLAS B. COMER

*Attesting Officer*      Acting Commissioner of Patents and Trademarks

UNITED STATES PATENT AND TRADEMARK OFFICE
CERTIFICATE OF CORRECTION

PATENT NO. : 4,992,111

DATED : February 12, 1991

INVENTOR(S) : Hiroshi Yamada et al.

It is certified that error appears in the above-identified patent and that said Letters Patent is hereby corrected as shown below:

Correct the cover sheet to add the following:

--[30]  Foreign Application Priority Data

August 15, 1988   [JP]   Japan   ........   63-202941--

Signed and Sealed this

Second Day of August, 1994

*Attest:*

BRUCE LEHMAN

*Attesting Officer*    Commissioner of Patents and Trademarks